United States Patent [19]

Kerlin

[11] 4,445,398

[45] May 1, 1984

[54] UNBALANCE COMPENSATOR CONTROL

[76] Inventor: Jack H. Kerlin, 1722 Sanford Pl., Ann Arbor, Mich. 48103

[21] Appl. No.: 358,999

[22] Filed: Mar. 17, 1982

[51] Int. Cl.³ .................... F16F 15/22; G01M 1/16; B24B 41/00
[52] U.S. Cl. .................. 74/573 R; 73/468; 73/66; 51/169
[58] Field of Search .............. 74/573 R, 573 F, 574; 51/169; 73/468, 470, 66

[56] References Cited

U.S. PATENT DOCUMENTS

| | | | |
|---|---|---|---|
| 1,604,748 | 10/1926 | Grauer | 74/573 F |
| 2,118,770 | 5/1938 | Siversten | 74/573 X |
| 2,322,561 | 6/1943 | Bevins et al. | 74/573 |
| 2,331,733 | 10/1943 | Senger | 74/573 |
| 2,937,613 | 5/1960 | Larsh | 74/573 |
| 2,945,398 | 7/1960 | Mullarkey | 74/573 |
| 3,149,502 | 9/1964 | Caruso et al. | 74/573 |
| 3,248,967 | 5/1966 | Lewis | 74/573 |
| 4,002,086 | 1/1977 | Reinhall | 74/573 F |
| 4,060,707 | 11/1977 | Olsson et al. | 73/66 |

FOREIGN PATENT DOCUMENTS

| | | | |
|---|---|---|---|
| 54-103390 | 8/1979 | Japan | 73/468 |
| 729458 | 4/1980 | U.S.S.R. | 51/169 |

Primary Examiner—Leslie A. Braun
Assistant Examiner—Anthony W. Raskob, Jr.
Attorney, Agent, or Firm—Stephenson & Boller

[57] ABSTRACT

An improved unbalance compensator control in which the distribution of balance mass fluid is controlled by selective activation of thermal devices creating thermal differentials and ensuing balance mass fluid re-distribution for balance correction, and in which electrical power for the thermal devices is transmitted across an air gap separating stationary and rotating portions by means of the selective energizing of primary coils each of which has a corresponding confronting secondary coil associated therewith. Different geometries of coils are disclosed. In another embodiment a composite waveform containing power and signal components is conducted to the rotating portion by electro-mechanical contact arrangements at opposite axial ends of the machine on which the unbalance compensator is mounted.

4 Claims, 9 Drawing Figures

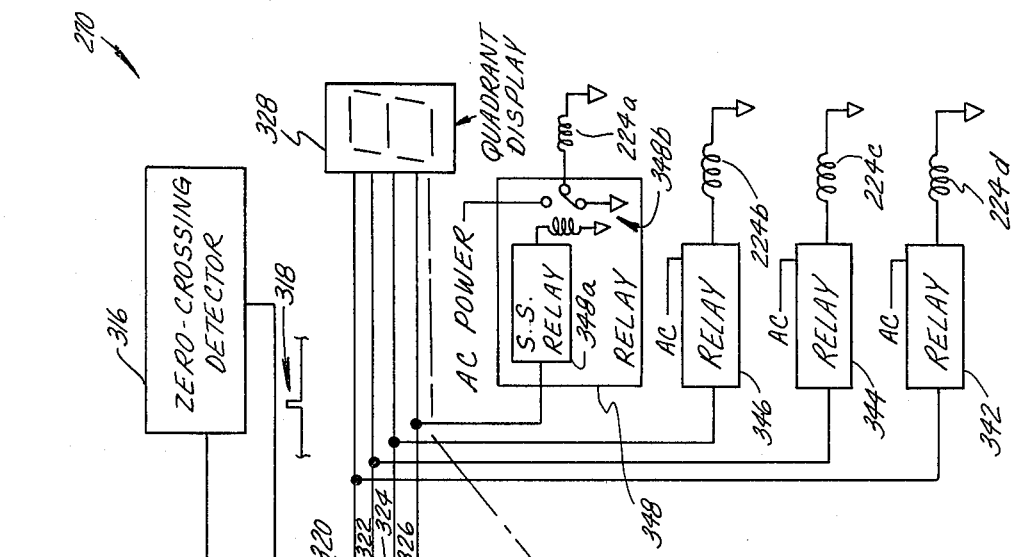
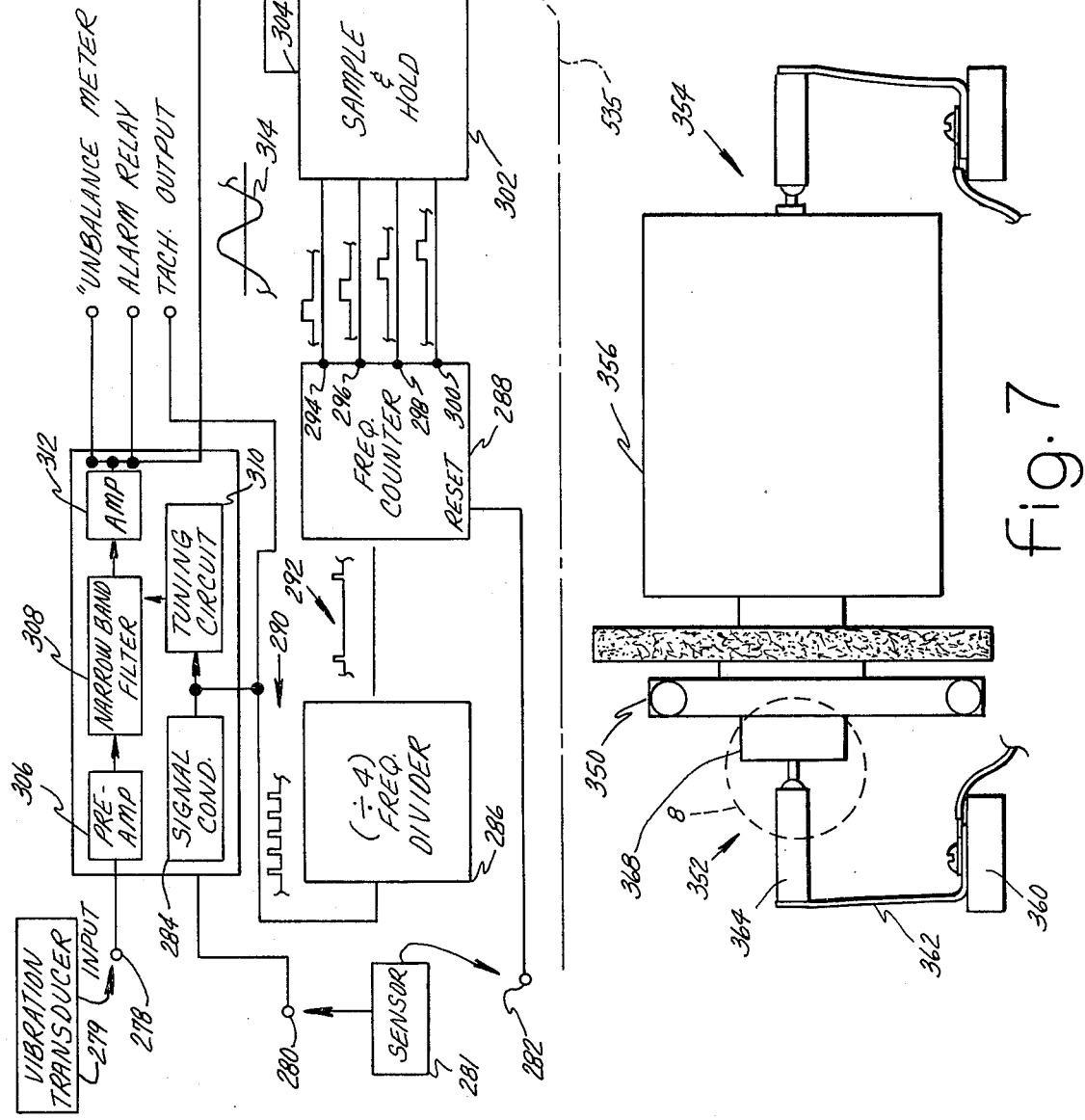

UNBALANCE COMPENSATOR CONTROL

REFERENCE TO RELATED APPLICATIONS

This application is related to applicant's earlier applications Ser. No. 255,477, filed Apr. 20, 1981 and now abandoned, and Ser. No. 342,450, filed Jan. 25, 1982, which was passed to issue Sept. 9, 1983.

BACKGROUND AND SUMMARY OF THE INVENTION

This invention relates to balancing systems for making repetitive balance corrections on rotary elements of machines that undergo variations of balance during normal operation and where an imbalance is corrected by remote control while such elements are rotating. More particularly the present invention relates to improvements in the control of such balancing systems.

The above identified two patent applications disclose a new and improved unbalance compensator which is unencumbered by limitations of prior unbalance compensators. The new and improved unbalanced compensator comprises a plurality of balancing chambers arranged circumferentially around the body of the compensator in a symmetrical fashion. Balancing mass is transferred between opposite chambers by creating a temperature differential between fluids contained in the respective chambers. The temperature differential gives rise to a higher vapor pressure in a warmer chamber creating vapor flow through a transfer tube to an opposite cooler chamber where the transferred vapor condenses. The port ends of each transfer tube are located in their respective chambers in such a manner as to prevent liquid fluid from entering and passing through the tube into an opposite chamber whether the compensator is rotating or stopped at any particular angular position. Thus the liquid fluid is essentially restricted to the chambers while only vapor is allowed to move between chambers. The creation of a temperature difference between fluids in opposing chambers may be by either a heating means, a cooling means, or a combination of both.

The above identified two patent applications disclose various types of controls for controlling the heating and cooling chambers for the purpose of performing balance corrections. One form of control employs a heating coil for each chamber. The heating coils are selectively energized. One mode of selective energization is by transmitting power to a selected heating coil through a corresponding slip ring and brush, each heating coil being connected to a corresponding slip ring and brush. In another form of control the slip rings and brushes are replaced by stationary and rotating coils (power and signal coil pair) which are coupled via transformer coupling. Electrical power is transmitted across an air gap via power coils and the appropriate heating coil is selected by means of a signal coupled across the air gap between signal coils. Appropriate electronics are used to encode the signal for transmission and to decode the signal at reception so that the correct heating coil is energized for correcting imbalance. Vibration indicative of imbalance is monitored by a vibration pick-up provided as input information to the electronic control. Phase information as to the angular position of imbalance is also provided as an input to the electronic control by means of a shaft position encoder. The electronic control acts upon this input data to energize the appropriate heating element for creating the required balance mass transfer to correct the imbalance.

The present invention is directed to a new and improved arrangement for the control of an unbalance compensator. One advantage of the present invention is that the electronic control circuitry does not have to be mounted on the rotating mass yet the transmission of electrical power to the heating coils can be accomplished via transformer type action. By removing any electronics from the rotating mass a number of advantages accrue. One advantage is that the separate packaging of the electronics in a module unique to the rotating balance mass can be eliminated. This saves on manufacturing complexities and service considerations. Another advantage is that the electronics can be removed from potential exposure to elevated temperatures. A certain amount of temperature rise may be due to the heat generated by the heating coils for the chambers. If the ambient temperature is also extremely high, the combined effect could give rise to the possibility of spurious operation and/or malfunction of the electronics due its thermal sensitivity. While a package may be designed with insulation and safeguards to protect it against this possibility, removal of the electronics from the rotating mass provides a very desirable alternative in many instances.

A further feature of the invention is that the compensator may be made more compact. Hence it can be used in applications where it might otherwise be impossible or, where extensive modification or rework would be required to a machine to be balanced. Furthermore, manufacturing and assembly considerations for the unbalance compensator are simplified.

In one embodiment the unbalance compensator of the present invention may comprise individual primary and secondary coils for each chamber heating coil. In one species of this embodiment the primary coils may be of a uniform diameter and arranged axially adjacent each other. The secondary coils are of a uniform diameter slightly larger than that of the primary coils and are also disposed axially adjacent each other with each being in axial alignment with the corresponding primary coil. The invention allows the appropriate heating coil to be energized with efficiency and without any significant loss occurring due to leakage to other coils.

In another embodiment of the invention the primary and secondary coils may be constructed as sets of concentric rings concentric with the axis of rotation. Each primary coil confronts the corresponding secondary coil. This arrangement is compact in the axial direction allowing the overall axial dimension of the compensator to be reduced. This is important in accommodating the application of the unbalance compensator to certain types of balance mass requirements.

In still another embodiment of the invention power and signal are transmitted as a composite waveform through electromechanical connections at opposite ends of the rotating mass. These electromechanical connections comprise circular ball stud elements at the axis of rotation at the opposite ends of the rotating mass. Each ball stud is seated in a conically tapered seat formed at one end of a bushing which is resiliently biased against the ball stud. One electromechanical connection is to one side of the line voltage and the other is to the opposite side of the line voltage. One ball stud is part of a module which is mounted concentric with the axis of the unbalance compensator and is of a smaller diameter than the overall diameter of the unbalance compensator. This module contains electronic circuitry and solid state relays. The composite waveform applied via the two electromechanical connections is monitored by the electronic circuitry. The electronic circuitry decodes the signal information to select an appropriate solid state relay. The selection of a solid state relay causes the electrical power component of the composite waveform to be applied to the appropriate heating coil. This embodiment eliminates the use of slip rings and brushes, and it does not require the use of transformer coupled coils on the rotating and non-rotating portions.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 4 is a view similar to FIG. 2 illustrating another embodiment.

FIG. 5 is an electrical schematic diagram illustrating the electronic control which is associated with the unbalance compensator shown in the preceding drawing figures.

FIG. 7 is a view, semi-schematic in nature, illustrating a still further embodiment of the invention.

DESCRIPTION OF THE PREFERRED EMBODIMENT

Figure 1:
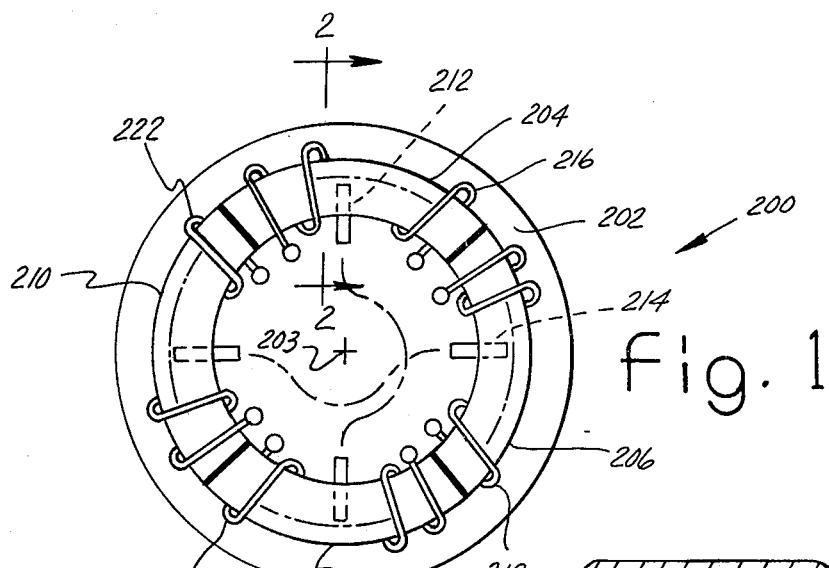
FIG. 1 is an axial view, semi-schematic in nature, illustrating an unbalance compensator embodying principles of the present invention and with portions removed.

FIG. 1 illustrates in one embodiment of unbalance compensator 200 of the present invention. The unbalance compensator 200 comprises a main circular body 202 via which the unbalance compensator mounts on a rotary mass to be balanced. The axis of rotation is identified by the numeral 203. Mounted on body 202 are four uniformly arranged balance chambers 204, 206, 208, and 210. Opposite balance chambers are communicated by transfer tubes; transfer tube 212 for chambers 204, 208, and transfer tube 214 for chambers 206 and 210. Thus the arrangement defines two separate sealed systems, orthogonally related, one system being the chambers 204, 208 and transfer tube 212 and the other being the chambers 206, 210 and the transfer tube 214. Each sealed system contains balance mass fluid.

Associated with each chamber is a heater element. The heater elements are identified as 216 for chamber 204, as 218 for chamber 206, as 220 for chamber 208 and as 222 for chamber 210. Each heater element is a heating coil wrapped around the corresponding chamber so that when energizing current flows through the heating coil heat is transferred to the balance mass fluid within the corresponding chamber. By selective energization of the heater elements, this creates a temperature differential between opposite chambers with the balance mass fluid vaporizing and the vapor transferring via the transfer tube to the opposite cooler chamber where it condenses. By controlled selective energizing of the heater elements the balance mass may be distributed in such a manner as to provide balance for the entire rotating mass so as to correct for any detected imbalances. This much of the unbalance compensator 200 is identical to the corresponding unbalance compensator disclosed in the above two prior patent applications.

Figure 2:
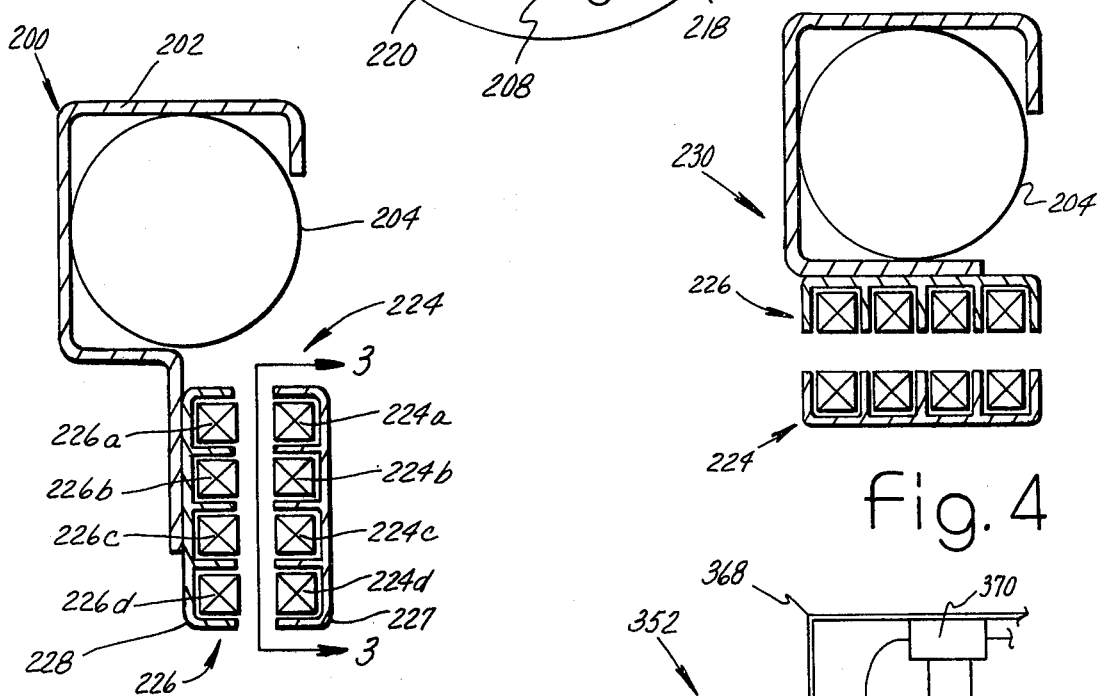
FIG. 2 is a sectional view on an enlarged scale taken substantially in the direction of arrows 2—2 in FIG. 1 and illustrating further detail of the unbalance compensator.
Figure 3:
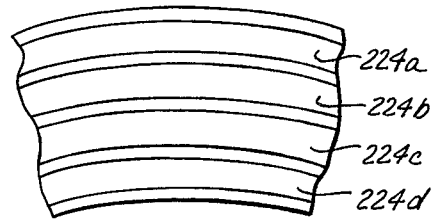
FIG. 3 is a fragmentary view taken in the direction of arrows 3—3 in FIG. 2.

FIG. 2 illustrates further detail of the unbalance compensator 200. Electric power for energization of the respective heater elements is provided via sets of electromagnetic coils. These coils are arranged concentric with the axis 203. They are arranged as a series of primary coils 224 and a series of secondary coils 226. There are four coils in each series and each individual coil is identified by the corresponding base reference numeral, 224 or 226, followed by a unique literal suffix. Thus a pair of coils 224a, 226a constitute a set of coupled coils for one of the heating; coils 224b, 226b, another set forth another of the heatings coils; etc. For example, the set 224a, 226a, may be for coil 216; the set 224b, 226b, for the coil 218; the set 224c, 226c, for the coil 220; and the set 224d, 226d for the coil 222. Each set of coils has the two coils confronting each other. The series of coils 226 are mounted on the body of the unbalance compensator for rotation with the rotating mass. The series of coils 224 is stationarily mounted, for example on the associated machine frame or other suitable structure.

It will be observed that the individual coils of each series are mounted in a corresponding annular frame of U-shaped cross section, 227 and 228 respectively, with the adjacent coils in each frame being separated by annular walls. Specifically, the construction of the frame and the separating walls is of electrical steel to provide for a particular concentration of the electromagnetic flux which is created when a coil is energized with electric current. At this point it should be mentioned that in the preferred mode of operation which will be described in detail hereinafter only one of the coils in the series 224 is energized at a given time. The flux concentration characteristic of the material forming the frame and walls is such that it provides a much closer coupling with the corresponding confronting secondary coil. In other words there is reduced leakage, or spill over, into adjacent coils which are not intended to be energized. Thus improved efficiency is obtained with this construction.

The coils of each series 224, 226 are fabricated as separate individual coils. Preferably each coil is fabricated from bondable magnet wire which is wound in a form corresponding to the shape of the particular position in the frame into which it is to be disposed. The coiled bondable magnet wire is heated in an oven so that the individual turns of wire bond together to form a unitary coil. The particular number of turns and the gage of the wire will be a function of the current, frequency and power requirements involved and these may be arrived at through conventional engineering computations.

Through the improved coupling which is obtained with the present invention a higher frequency of alternating current for energizing the heater coil may be used. This results in a still greater efficiency for it means that less copper need be used in the fabrication of the coils. Furthermore by having the coils as concentric rings confronting each other at the stationary and rotary portions, it means that the compensator may be made more compact in the axial direction. This can be a very important consideration in certain applications of the invention. For example it may mean that the invention can be applied to a given machine without the need to perform an extensive rework of the machine to accommodate the mounting of the unbalance compensator. It has been found that operating frequencies as high as 1200 Hertz can be used with great effectiveness.

Thus from the foregoing description it can be perceived that the application of energizing current to coil 224a will be effective via transformer coupling with coil 226a to energize winding 216 and similarly for energization of each remaining stationary coil with respect to its associated heating coil.

FIG. 4 illustrates another embodiment 230 of the invention. This embodiment 230 is the same as embodiment 200 except for the particular disposition of the two series of coils 224, 226. In the embodiment 230 the stationary coils 224 are arranged as a series of axially adjacent coils of uniform diameter concentric with the axis 203. The series of coils 226 is arranged as a series of individual coils axially spaced adjacent and each of a slightly larger diameter than the corresponding stationary coil. The frames for the coils are of the same electrical steel and the individual coils are preferrably fabricated in exactly the same manner.

In the embodiments of FIGS. 2 and 4, each individual coil may be viewed as disposed in its own annular receptacle of U-shaped cross section with immediately adjacent receptacles of each series sharing a common leg. Each confronting receptacle pair has the legs of the confronting U's spaced closely forming the air gap across which the magnetic flux is concentrated. Hence, a very close coupling is obtained for each pair of coils. The particular details of fabrication of the coil and receptacle structures are not especially critical and various embodiments are envisioned. A particularly convenient way to fabricate the frame for mounting the coils, in the case of the FIG. 4 embodiment is to make the end walls and the separating walls of identical metal rings. These and the coils are assembled onto a metal tube. As a coil is assembled onto the tube, it is followed by the insertion of one of these rings onto the tube. This sequence is continued for the entire assembly with the rings being secured to the tube in any suitable manner. In the case of the FIG. 2 embodiment, it would be possible to form each U-shaped receptacle as a separate annular element of U-shaped cross section and then joining these together at the common legs. Still another way might be to form or draw the frame into a shape which would provide the individual coil receptacles. These are given merely by way of examples and should not be construed as imposing limitations on the scope of the invention.

FIG. 5 illustrates an example by an electronic control 270 which is well suited for use with the unbalance compensator. Briefly, the control 270 receives input signals relating to rotation of the spindle mounted mass to be balanced and acts upon these signals to develop control signals causing application of electric power to the proper heating coils of the chambers so that the proper balance mass vapor transfer necessary to maintain precise balance occurs. The circuitry may be contained within a control unit which is located in association with the machine on which the unbalance compensator is used. None of the circuitry is mounted on the rotary mass.

One input 278 is connected to receive a vibration signal from a vibration transducer 279 which is suitably mounted on the machine to sense vibration caused by imbalance. Further inputs 280, 282 receive rotary spindle position signals. These signals are derived from a position sensor 281 which is mounted on the machine in association with the rotating spindle shaft. The purpose of position sensor 281 is to provide signals which are indicative of the instantaneous rotational position of the spindle. The sensor 281, in conjunction with a portion of the control circuit, constitute what is commonly known as a shaft position encoder. The shaft position encoder includes a signal conditioning circuit 284, a frequency divider circuit 286, and a frequency counter circuit 288.

Let it be assumed that the signal channel connected to input terminal 280 receives a waveform consisting of 16 pulses per revolution of the spindle shaft. Hence, the pulses are spaced apart at intervals corresponding to $22\frac{1}{2}$ degrees of spindle rotation. A signal conditioning circuit 284 conditions the pulse waveform into a rectangular pulse train 290. The pulse train 290 consists of individual rectangular pulses each spaced apart $22\frac{1}{2}$ degrees of spindle shaft rotation. A frequency divider circuit 286 divides the frequency of the pulse train 290 by four so that a pulse train 292 is produced in which the individual rectangular pulses are spaced apart 90° of spindle shaft rotation. The frequency divided pulse train 292 is supplied to the count input of a frequency counter circuit 288. A reset input of frequency counter 288 is connected to receive a shaft position signal supplied by sensor 281 to terminal 282. This latter signal is a pulse given one per revolution of the spindle shaft. Hence, the frequency counter 288 is reset every 360 degrees of rotation of the spindle shaft.

The frequency counter circuit has outputs 294, 296, 298, and 300. Each of these inputs is successively energized in response to pulses of the pulse train 292. If it is considered that the reset pulse occurs at the 0° position of the spindle shaft, then the signal at output 294 provides a pulse during the first 90° of rotation of the spindle shaft from the 0° position. Similarly, it will be perceived that the remaining outputs 296, 298, 300 provide successive output pulse signals during the second 90°, the third 90°, and the fourth 90° respectively of spindle shaft rotation. In this way signals appearing at the outputs 294, 296, 298 and 300 of the frequency counter circuit are effective to indicate in which quadrant of rotation the spindle shaft is at any particular instant of time.

The four output signals from frequency counter circuit 288 are supplied to corresponding inputs of a sample and hold circuit 302. The sample and hold circuit 302 also receives a further input at a terminal 304. Therefore, before circuit 302 is described in detail, it is appropriate to consider how the signal which is supplied to terminal 304 is developed.

The terminal 278 is connected to receive the vibration signal from the vibration transducer. The vibration transducer may comprise an inductance coil containing a spring-mounted magnetic mass. As vibrations are sensed, the magnetic mass oscillates in relation to the coil in such a manner that the coil provides a sinusoidal output signal whose frequency corresponds exactly to the rotational frequency of the spindle shaft and whose peak amplitude is indicative of the magnitude of vibrations. The phase of the transducer output signal is related however to the circumferential location of imbalance.

The circuit includes a preamplifier stage 306 which receives and amplifies the input signal from the vibration transducer. This amplified vibration transducer signal is then supplied to a tunable narrow band filter circuit 308. The narrow band filter circuit 308 has a tunable center frequency controlled by a tuning circuit 310. The tuning circuit receives the pulse waveform 290 and provides an output signal which is related to the frequency of the pulse waveform 290. This output signal is supplied to the narrow band filter circuit 308 to adjust the center frequency. Because the frequency of waveform 290 is indicative of spindle shaft speed, the center frequency of the narrow band filter is thereby automatically set to the spindle shaft speed. In this way, the narrow band filter circuit is continuously tuned to whatever the instantaneous spindle shaft speed happens to be. Because vibrations of interest are at the spindle shaft speed, the amplified vibration signal is passed through the filter circuit 308 to amplifier stage 312.

The amplifier stage 312 is wide band so as to provide amplification over the full range of possible vibration frequencies corresponding to variations in spindle shaft speed. The output signal of amplifier stage 312 may be considered therefore as the unbalance signal indicated by the waveform 314. The unbalance signal will be of a generally sinusoidal character having a frequency corresponding to the instantaneous rotational frequency of the spindle shaft and having a peak amplitude corresponding to the magnitude of vibrations. The information of interest insofar as the present embodiment is concerned is the phase of the zero crossing of the signal from one polarity to the other polarity, for example, from positive to negative. The phase of the vibration signal, as noted above, corresponds to the angular position of shaft imbalance. Hence, the zero crossing can be used to provide an indication of the angular position of the imbalance.

The signal 314 is therefore supplied as an input to a zero crossing detector circuit 316. The zero crossing detector looks for zero crossings of the signal from one selected polarity to the opposite polarity, and whenever that occurs, the zero crossing detector provides an output pulse signal such as the pulse 318 indicated in the drawing figure. Hence, the pulse 318 will be given once per revolution of the spindle shaft and its phase will indicate the angular location of the imbalance in the rotating mechanism.

The sample and hold circuit 302 can now be considered in detail. It comprises four output terminals 320, 322, 324, and 326 each of which corresponds to one of the inputs received from frequency counter 288. The sample and hold circuit 302 may be considered as comprising four individual sample and hold circuits each of which is associated with a corresponding input received from circuit 288 and a corresponding output 320, 322, 324, 326. The zero crossing detector pulse signal 318 is supplied to each of the four individual sample and hold circuits. The operation of circuit 302 is such that when the zero crossing pulse 318 is given, that input line which is receiving the quadrant signal from frequency counter 288 will cause the corresponding output 320, 322, 324, 326 to be energized. The individual sample and hold circuits maintain this status until the next occurrence of the zero crossing pulse 318. Hence, so long as the zero crossing pulse 318 continues to be given during a particular quadrant of rotation, then the corresponding output 320, 322, 324, 326 remains activated. Whenever the phase of the zero crossing pulse 318 changes to a new quadrant then the output 320, 322, 324 and 326 corresponding to that new quadrant is activated. A visual display 328 is connected to the outputs 320, 322, 324 and 326 to provide a visual display of which quadrant signal is being given. As will be seen, this display is useful in set-up of the system at initial installation as well as during operation.

Each of the four outputs 320, 322, 324, 326 of sample and hold circuit 302 is connected to the input of a corresponding relay circuit 342, 344, 346, 348. Each relay circuit is in turn coupled to one of the primary coils 224. The relay circuits 342, 344, 346, 348 are identical, and hence the detail of only one is shown in the drawing figure.

Therefore, considering detail of the the relay circuit 348, one can see that it comprises a solid state relay 348a which is connected to receive the corresponding electronic signal from sample and hold circuit 302 and in turn drive a mechanical relay 348b in accordance with the sample and hold signal. The electromechanical relay 348b is a double pole type. When the signal from the sample and hold circuit is such that the corresponding coil 244a is not to be energized the relay assumes a position whereby the terminal of the coil 224a connected to the relay is grounded. Because the opposite terminal of the coil 224a is also grounded, the coil is effectively short circuited. Whenever the signal from the sample and hold circuit calls for coil 224a to be energized, then the mechanical relay 348b is operated by the solid state relay 348a to a position whereby the terminal of the coil connected to the relay is coupled through to an AC power source. This causes the coil 224a to receive energizing current via the relay 348b and hence the coil 224a is energized.

The overall operation will now be apparent. At any given time, three of the four primary coils are shorted out while one of them is energized. It has been found by shorting the non-energized coils that a very significant improvement in the coupling efficiency of the energized primary coil to its secondary coil is obtained. This allows the power to be transferred across the airgap most efficiently. For example, wattages of 500 to 600 watts can be readily transferred with relatively modest coils and current levels. Furthermore, the use of high frequency alternating current (much higher than the typically available 60 Hertz live voltage) also provides an increased efficiency coupling. The reason is that inductive reactance increases with frequency thereby reducing current flows and concomitant ohmic losses in the coils. The invention therefore provides a very useful and efficient arrangement for the control of the unbalance compensator.

Figure 6:
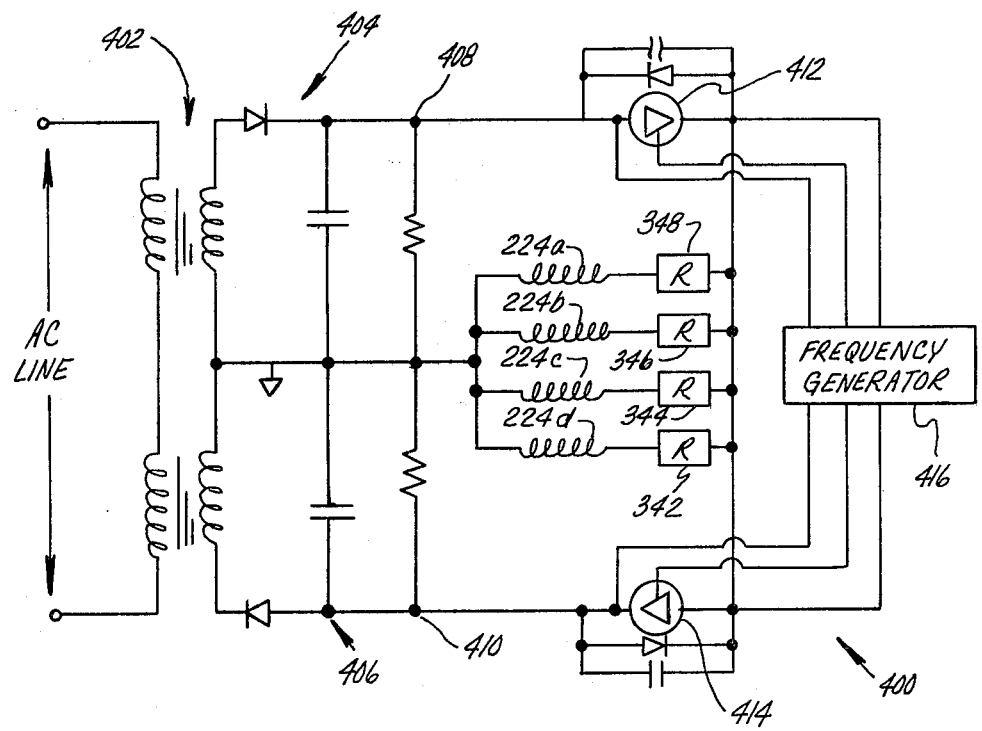
FIG. 6 is an electrical schematic diagram of a portion of the control showing further detail.

FIG. 6 illustrates an example of a high frequency power generator circuit 400 which can supply the high frequency energizing current for the coils 224. The circuit comprises a transformer section 402 having an input connected across a standard 60-cycle AC line. Coupled to the secondary portions of transformer 402 are rectifying stages 404 and 406, respectively. Rectifying stage 404 develops at the point indicated by the numeral 408, a positive DC level relative to ground. Rectifying stage 406 develops at the point 410 a comparable negative DC level relative to ground. The remainder of circuit 400 comprises what may be considered a chopper-type circuit which chops the respective positive and negative DC levels to develop an alternating current waveform for application to the coils 224. Unlike a conventional chopper, however, the present chopper utilizes power MOSFET devices 412 and 414, respectively. Operation of the power MOSFET devices at the desired chopping frequency is controlled by a frequency generator circuit 416 which has one set of three terminals operatively connected to the drain, source, and gate terminals of power MOSFET 412 and another set connected to the drain, source, and gate terminals of power MOSFET 414. The frequency generator circuit 416 provides signals at the desired chopping frequency to operate the power MOSFET devices in alternation so that the respective positive and negative DC levels at 408 and 410 are alternately applied to the selected one of the coils 224 which is being energized. The circuit is particularly advantageous in that it can be fabricated at a cost which is considerably less than the cost of conventional chopper circuits, and it can provide the necessary power requirements at the higher frequencies.

Figure 8:
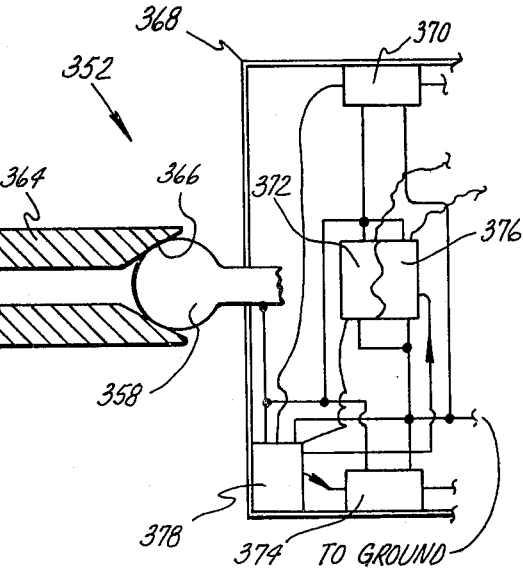
FIG. 8 is an enlarged view taken in circle 8 of FIG. 7 illustrating further detail.

FIGS. 7 and 8 illustrate a still further embodiment of compensator 350. This embodiment does not require the use of primary and secondary coils for transmitting energy across an airgap between the stationary and rotating portions. Instead, it utilizes electromechanical type contact arrangements 352, 354, respectively, at opposite ends of the rotating mass.

FIG. 7 illustrates a machine 356 such as a grinding machine on which the unbalance compensator is mounted. The machine 356 by itself has a rotating spindle and typically the machine components such as the spindle shaft are electrically floating. Therefore a ground connection for the unbalance compensator is provided at the right hand end of the machine as viewed in FIG. 7 by the provision of the electromechanical contact arrangement 354. The other side of the line voltage is supplied to the unbalance compensator via the electromechanical contact arrangement 352. Mounting of the compensator to the machine provides for a grounding of certain components of the unbalance compensator to the shaft via the contact arrangement 354.

The contact arrangements 352, 354 are substantially identical and details can be seen from consideration of a detailed view of the contact arrangement 352 shown in FIG. 8. The contact arrangement comprises a ball stud 358 coaxial with the axis of rotation and forming a part of the unbalance compensator. An insulator block 360 is stationarily mounted with respect to the machine adjacent the left hand end. A conductive cantilever spring 362 supports a conductive bushing 364 from the insulator block 360 in substantial alignment with the ball stud 358. The bushing is of a generally tubular shape and the right hand end includes a conical seat 366 within which the spherical contoured head of the ball stud seats. A forceful engagement is obtained by the resilient spring force of the cantilever 362. The arrangement functions in the following manner. As the machine 356 operates, the unbalance compensator including the ball stud 358 rotates. Bushing 364 is urged into contact with the head of the ball stud thereby providing electrical continuity for current flow from the line to the unbalance compensator. A similar continuity for ground current flow is provided by the contact 354.

As can also be seen in FIG. 8, there are certain components within the unbalance compensator which provide for operation of the proper chamber heater element. A small circular cap 368 at the left hand end of the unbalance compensator to which the ball stud 358 is affixed houses these components, or modules. Wires from the ball stud connect to respective modules. These modules are identified by the reference numerals 370, 372, 374, 376 and each is associated with a respective one of the chamber heating coils. There is also a suitable connection of the line side to another module 378. The wire which leads from each module, 370, 372, 374, 376 to a respective one of the heating coils carries current to that heating coil when the module is activated. After passing through the heating coil the current returns via a ground wire suitably connected to the rotating spindle of the machine and via the contact 354 to ground. Thus, the ball stud 358 is electrically isolated from the ball stud of the arrangement 354. The module 378 contains electronic circuitry for controlling which one of the modules 370, 372, 374, 376 is activated. The circuitry which it contains is shown in FIG. 9.

Figure 9:
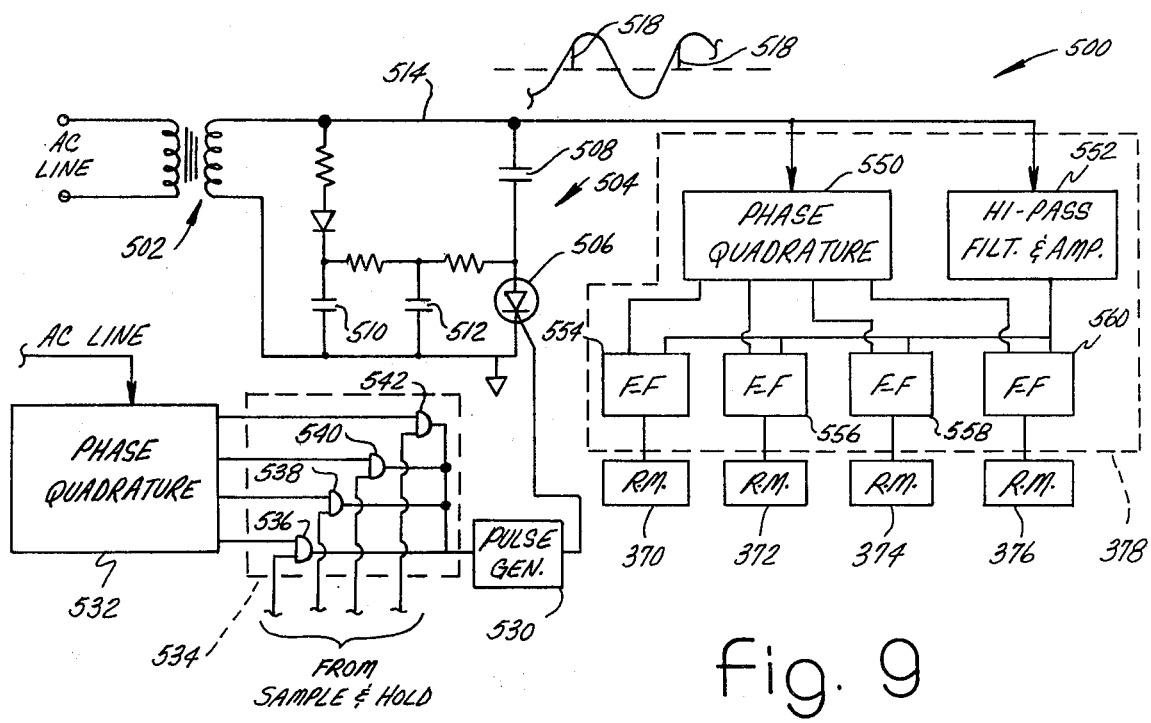
FIG. 9 is an electrical schematic diagram illustrating a portion of the electrical control which is used in conjunction with the embodiment of FIGS. 7 and 8.

FIG. 9 illustrates a portion of the control circuit which is used with the embodiment of FIGS. 7 and 8. This circuit portion is designated by the reference numeral 500, and comprises a transformer 502 which receives the AC line voltage, such as a 60 Hertz AC voltage. This AC voltage constitutes the power component of the composite waveform which is to be developed. The signal portion of the composite waveform is provided by a circuit stage 504 comprising an SCR 506 whose gate terminal is connected to receive a pulse input from a pulse generator circuit 530. The manner in which the pulse output of pulse generator circuit 530 is developed will be explained first.

Associated with pulse generator circuit 530 are a phase quadrature circuit 532 and a logic circuit 534. The logic circuit 534 comprises four individual AND logic gates 536, 538, 540, 542. The phase quadrature circuit receives the AC line signal and develops at its four outputs pulse waveforms in which the pulses are successively phased at 90° intervals. Thus each output signal of the phase quadrature circuit 532 is uniquely related to a particular 90° segment of the AC voltage.

Each AND logic gate comprises a pair of inputs one of which is connected to a corresponding one of the outputs of the phase quadrature circuit and the other of which is connected to a particular one of the outputs of sample and hold circuit 302. Thus the circuit portion 500 shown in FIG. 9 represents only a portion of the entire control, the remainder of the control being that portion of the circuit shown above the broken line 535 in FIG. 5.

The outputs of the four AND logic gates are connected in common to the input of the pulse generator circuit 530. With this arrangement the occurrence of the zero crossing detector pulse 318 will cause a particular one of the sample and hold output lines to produce an activated output indicative of the occurrence of the zero containing detector pulse. This will be coincident with a particular one of the output signals from the phase quadrature circuit and hence the corresponding AND logic gate will produce an output to the pulse generator. The pulse generator in turn produces an output pulse for switching SCR 506 into conduction. It can therefore be understood that SCR 506 is switched into conduction in accordance with the phase of the zero crossing detector pulse 118.

The circuit stage 504 includes a number of resistors, capacitors and a diode which are connected with the SCR 506 and with the secondary of transformer 502 in the manner shown in FIG. 9.

Assuming that no pulse input is being received from pulse generator 550, the stage 504 is in a condition where SCR 506 is not conductive. This means that the capacitor 508 is uncharged. The other two capacitors 510, 512 are, however, charged. Hence, the waveform appearing at point 514 relative to ground is simply a value which corresponds to the AC line voltage. When a pulse input from the pulse generator is received, SCR 506 is suddenly switched into conduction. The result is to suddenly pull the voltage at 514 through capacitor 508 to ground thereby effectively introducing a grounding spike 518 onto the waveform. The charge on capacitors 510 and 512 dumps through the resistors associated therewith and through the SCR. The circuit however quickly recovers due to the charging of capacitor 508 and hence the spike disappears with the normal sinusoidal line waveform thereafter continuing. During recovery, the capacitor 508 discharges through the three resistors and diode of circuit 504, and capacitors 510 and 512 are recharged. This results in SCR 506 being turned off. The circuit 504 remains in this condition until the next pulse input from the pulse generator.

The module 378 contains a phase quadrature circuit 550, a highpass filter and amplifier circuit 552 and four flip-flops 554, 556, 558 and 560. These are connected as illustrated in FIG. 9. Phase quadrature circuit 550 develops four respective 90° pulse waveforms each corresponding to a corresponding one of the quadrants of the 360° of the sinusoidal power waveform. Each phase quadrature signal is supplied to one input of a corresponding flip-flop circuit. The highpass filter and amplifier circuit 552 filters the sinusoidal power component from the composite signal to only pass the grounding spike pulses to the flip-flops. Depending upon which one of the quadrants of the sinusoidal waveform contains the grounding spike pulse, a corresponding one of the flip-flops will be activated. That flip-flop which is activated in turn operates the corresponding relay module 370, 372, 374, 376 to in turn energize the corresponding heating coil. If the phase of the grounding spike changes from one quadrant to another, then a different one of the heating coils is energized. It can be seen therefore that this arrangement does not require the use of the transformer-coupled coils to transmit power from a primary coil to a secondary coil.

The quadrant display readout 328 is particularly useful at the time of initial installation of the unbalance compensator on a machine. Because the control is of a closed-loop nature, it must be ensured that the feedback is of a negative, or non-regenerative, character so that the desired control takes place. Such assurance can be obtained by a procedure involving placement of deliberate imbalance at a particular angular location in relation to the defined quadrants, say for example at the common junction of quadrants three and four. If the control is properly phased, then the display on readout 128 changes back and forth between the numbers three and four. If such is not the case, then a different condition is observed on the readout display. Proper phasing is obtained by adjusting the phase of the once per revolution pulse at terminal 282. In the present embodiment the means for generation of this once per revolution pulse comprises a pin which is circumferentially positionable on the rotary shaft at 22½ angular increments in association with the pick-up connected to terminal 282. Hence this pin may be repositioned to the appropriate one of the 16 different angular positions so that the desired response is observed on the display readout. Depending upon the particular readout display it may be necessary to perform one or several repositionings of the marker pin on the shaft before the final position is ascertained.

The invention has been shown in the foregoing description to constitute an improved unbalanced compensator control. While a preferred embodiment has been disclosed, it will be appreciated that other embodiments are contemplated within the scope of the invention.

What is claimed is:

1. In a machine having a rotary mass requiring balancing, an unbalance compensator comprising a rotary portion adapted to be mounted on the rotary mass requiring balancing, balancing mass means on the rotary portion, distribution means for distributing the balance mass means on the rotary portion so as to correct for imbalance, and control means for the distribution means, the improvement in said control means which comprises a first contact on the unbalance compensator concentric with the axis of rotation of the rotary mass, a second contact stationarily arranged and biased against said first contact, a third contact on the rotary balance mass concentric with the axis of rotation and a fourth contact stationarily arranged and biased against the third contact, means for applying a composite waveform across the two stationary contacts with the waveform containing power and signal components, means coupling the first and third contacts with the distribution means comprising means responsive to the signal component of the composite waveform for controlling distribution of the balance mass means through the appropriate application of the power component of the composite waveform to the balance mass means.

2. The improvement set forth in claim 1 in which the first and third contacts are ball studs and the second and fourth contacts are cantilever-mounted bushings having seats engaging the respective ball studs.

3. The improvement set forth in claim 1 in which the first and third contacts are disposed on respective axial ends of structure forming the rotary mass and the rotary portion of the unbalance compensator, and said second and fourth contacts are in axial alignment with said respective axial ends.

4. In a machine having a rotary mass requiring balancing about an axis of rotation, an unbalance compensator comprising a rotary portion mounted on said rotary mass, balancing mass means on said rotary portion, distribution means for distributing the balance mass means on said rotary portion so as to correct for imbalance, and control means for the distribution means, the improvement in said control means which comprises a pair of contacts in alignment with and facing axially of said axis, said pair of contacts rotating with said rotary mass and said rotary portion and being electrically coupled with electrical circuitry on said rotary portion for control of said distribution means, and a second pair of contacts which do not rotate with said rotary mass and said rotary portion, each of said second pair of contacts being coaxial with said axis and bearing axially against a corresponding one of said first-mentioned pair of contacts, and means for applying an electrical waveform across said second pair of contacts, said waveform comprising both power and signals for control of said distribution means by said electrical circuitry, said electrical circuitry comprising means responsive to said signals for controlling distribution of the balance mass means through the appropriate application of said power to the balance mass means.

* * * * *